(12) United States Patent
Tani et al.

(10) Patent No.: US 8,725,304 B2
(45) Date of Patent: May 13, 2014

(54) PLANT CONTROLLER

(75) Inventors: Michinori Tani, Wako (JP); Kenichi Maeda, Wako (JP); Atsuhiro Miyauchi, Wako (JP); Seiji Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 13/239,787

(22) Filed: Sep. 22, 2011

(65) Prior Publication Data

US 2012/0101641 A1    Apr. 26, 2012

(30) Foreign Application Priority Data

Oct. 25, 2010    (JP) .................................. 2010-238990

(51) Int. Cl.
*G06F 19/00*    (2011.01)

(52) U.S. Cl.
USPC .............................. 700/287; 700/286; 290/44

(58) Field of Classification Search
CPC ...................... G05B 2219/15039; G05B 15/02; F05B 13/04; F05B 23/02; F02D 41/1402; F02D 2041/1401; F02D 2041/1415; F02D 2014/1425; F03D 7/0272
USPC ............... 700/287, 286, 275, 292, 17; 290/44
See application file for complete search history.

(56) References Cited

U.S. PATENT DOCUMENTS

| 4,707,778 A * | 11/1987 | Yamada et al. ................. 700/3 |
| 6,301,895 B1 * | 10/2001 | Kallina et al. ................. 60/653 |
| 6,697,685 B1 * | 2/2004 | Caldwell ........................ 700/71 |
| 7,557,457 B2 * | 7/2009 | Richter et al. ................. 290/44 |

FOREIGN PATENT DOCUMENTS

JP    2001-090584    4/2001

* cited by examiner

*Primary Examiner* — Kidest Bahta
(74) *Attorney, Agent, or Firm* — Ditthavong Mori & Steiner, P.C.

(57) ABSTRACT

A plant controller includes a feedback controller configured to calculate a control input provided to a plant so that a control output of the plant matches a target value. The feedback controller includes a controller transfer function that is a transfer function of the feedback controller. The controller transfer function is expressed by a product of an inverse transfer function of a transfer function of a control target model obtained by modeling the plant and a disturbance sensitivity correlation function defined using a sensitivity function. The sensitivity function indicates sensitivity of a disturbance to be applied to the plant with respect to the control output. The sensitivity function is defined by using a response characteristic parameter that indicates a response characteristic of the plant.

20 Claims, 11 Drawing Sheets

PLANT CONTROLLER

CROSS-REFERENCE TO RELATED APPLICATIONS

The present application claims priority under 35 U.S.C. §119 to Japanese Patent Application No. 2010-238990, filed Oct. 25, 2010. The contents of this application are incorporated herein by reference to their entirety.

BACKGROUND OF THE INVENTION

1. Field of the Invention

The present invention relates to a plant controller.

2. Discussion of the Background

Japanese Unexamined Patent Application Publication No. 2001-90584 discloses an air-fuel ratio controller of an internal combustion engine. Such a controller performs feedback control based on the deviation between a detected air-fuel ratio and a target air-fuel ratio and thereby determines an air-fuel ratio correction coefficient. More specifically, the air-fuel ratio correction coefficient is calculated by a model defining equation that defines a model to be subjected to control, and a control parameter that is a coefficient of the model defining equation is calculated on the basis of the amount of engine intake air, the response time constant of an air-fuel sensor, and a calculation interval. Then, the air-fuel ratio correction coefficient is determined by applying the thus calculated control parameter to the model defining equation.

The conventional controller described above determines the air-fuel ratio correction coefficient that is a control input using a control parameter to be set on the basis of the amount of engine intake air. The calculation of such a control parameter uses a control gain ω that is set in advance by taking into consideration the control stability and response.

SUMMARY OF THE INVENTION

According to one aspect of the present invention, a plant controller includes a feedback controller configured to calculate a control input provided to a plant so that a control output of the plant matches a target value. The feedback controller includes a controller transfer function that is a transfer function of the feedback controller. The controller transfer function is expressed by a product of an inverse transfer function of a transfer function of a control target model obtained by modeling the plant and a disturbance sensitivity correlation function defined using a sensitivity function. The sensitivity function indicates sensitivity of a disturbance to be applied to the plant with respect to the control output. The sensitivity function is defined by using a response characteristic parameter that indicates a response characteristic of the plant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
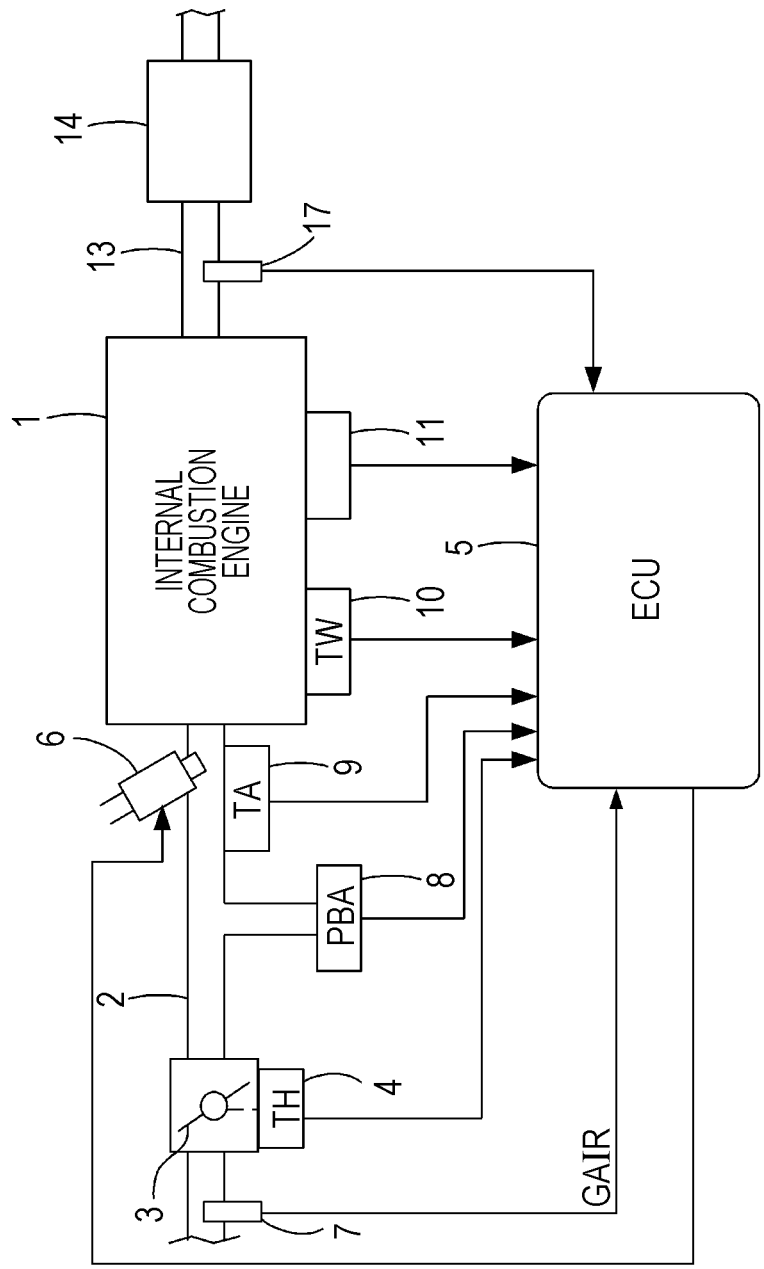
FIG. 1 is a diagram showing a configuration of an internal combustion and its controller according to an embodiment of the present invention.

The embodiments will now be described with reference to the accompanying drawings, wherein like reference numerals designate corresponding or identical elements throughout the various drawings.

First Embodiment

FIG. 1 shows an overall configuration of an internal combustion engine (hereinafter referred to as "engine") and its controller according to an embodiment of the present invention. For example, a 4-cylinder engine 1 has a throttle valve 3 provided halfway along the length of an intake pipe 2 thereof. A throttle valve opening sensor 4 for detecting a throttle valve opening TH is coupled to the throttle valve 3 and its detected signal is sent to an electronic control unit (hereinafter referred to as "ECU") 5.

A fuel injection valve 6 is provided in the intake pipe 2 for each cylinder between the engine 1 and the throttle valve 3 so as to be located somewhat upstream of an intake valve (not illustrated). The fuel injection valve is coupled to a fuel pump (not illustrated) and at the same time is electrically connected to the ECU 5 whose signal is used to control valve opening time of the fuel injection valve 6.

An intake air flow sensor 7 for detecting an intake air flow GAIR is provided upstream of the throttle valve 3. Also, an intake pressure sensor 8 for detecting an intake pressure PBA and an intake temperature sensor 9 for detecting an intake temperature TA are provided downstream of the throttle valve 3. Furthermore, an engine coolant temperature sensor 10 for detecting an engine coolant temperature TW is mounted in the engine 1. Signals from these sensors 8 to 10 are supplied to the ECU 5.

A crank angle position sensor 11 for detecting a rotational angle of a crank shaft (not illustrated) of the engine 1 is connected to the ECU 5 to which a signal according to a crank shaft rotational angle is supplied. The crank angle position sensor 11 consists of a cylinder determination sensor that generates a pulse (hereinafter referred to as "CYL pulse") at a predetermined crank angle position of a specific cylinder of the engine 1, a TDC sensor that generates a TDC pulse at a crank angle position before a predetermined crank angle (at every crank angle of 180 degrees for an 4-cylinder engine) in relation to a top dead center (TDC) from which an intake stroke of each cylinder starts, and a CRK sensor that generates one pulse (hereinafter referred to as "CRK pulse") at intervals (for example, at intervals of 6 degrees) of a constant crank angle shorter than the TDC pulse. The CYL pulse, the TDC pulse, and the CRK pulse are supplied to the ECU 5. These pulses are used for control of various timings such as a fuel injection timing and an ignition timing, and for detection of an engine number of revolutions (engine rotational speed) NE.

An exhaust pipe 13 has an exhaust emission control catalyst 14 provided therein and also has a proportional oxygen concentration sensor 17 (hereinafter referred to as "LAF sensor 17") mounted upstream of the exhaust emission control catalyst 14. The proportional oxygen concentration sensor 17 generates a detection signal substantially proportional to oxygen concentration (air-fuel ratio) in exhaust gas emissions and supplies to the ECU 5.

The ECU 5 includes an input circuit that shapes the waveform of input signals from various sensors, alters a voltage level to a predetermined level, and converts an analog signal into a digital signal, a central processing unit (hereinafter referred to as "CPU"), a storage circuit that stores various operation programs to be executed by the CPU and their results, and output circuit that supplies a drive signal to the fuel injection valve 6.

The ECU 5 determines a fuel injection duration TOUT (substantially proportional to the amount of injected fuel and hereinafter referred to as "fuel injection amount") of the fuel injection valve 6 in such a manner that a detected air-fuel ratio matches a target air-fuel ratio that is set on the basis of the operating condition of the engine, and performs fuel injection through the fuel injection valve 6 in accordance with the fuel injection amount TOUT, thereby performing air-fuel ratio feedback control.

A method of configuration of a feedback controller according to this embodiment is described below with reference to FIGS. 2, 3A, and 3B.

Figure 2:
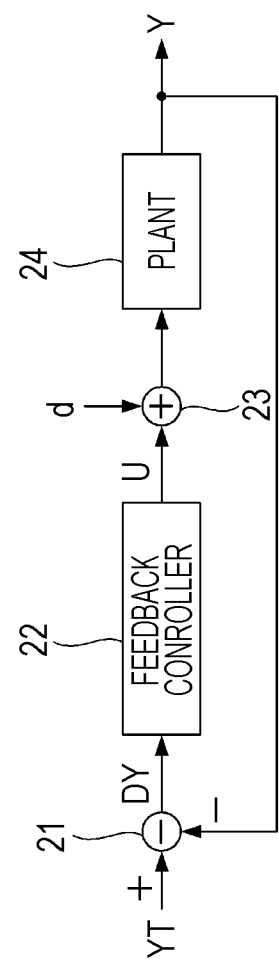
FIG. 2 is a block diagram showing a typical configuration of a feedback control system.

FIG. 2 is a block diagram showing a typical configuration of a feedback control system that performs feedback control of a control output Y of a plant to be subjected to control. Such a control system includes a subtractor 21, feedback controller 22, an adder 23, and a plant 24 to be subjected to control.

The subtractor 21 calculates a deviation DY by subtracting a control output Y from a target value YT, while a feedback controller 22 calculates a control input U so that the deviation is "0", namely, the control output Y matches the target value YT. The adder 23 does not actually exist as an arithmetic unit, but it is intended for modeling in a form where a disturbance d to be applied to the plant 24 is added to the control input U.

The control system is expressed by the following equations (1) and (2). P(z) of the equation 1 is a transfer function of the plant 24, while C(z) of the equation 2 is a transfer function of the feedback controller 22. "(z)" is placed to indicate the transfer function of a discrete-time system.

$$Y(z) = P(z) \cdot (U+d) \tag{1}$$

$$U = C(z) \cdot DY = C(z) \cdot (YT - Y) \tag{2}$$

At this time, sensitivity function S(z) showing the sensitivity of the disturbance d for the control output Y is given by the following well-known equation (3).

$$S(z) = 1/(1 + C(z) \cdot P(z)) \tag{3}$$

The transfer function C(z) of the feedback controller 22 is given by the following equation (4) through the transformation of the equation (3).

$$C(z) = \frac{1 - S(z)}{S(z)} \cdot \frac{1}{P(z)} \tag{4}$$

The transfer function C(z) of the feedback function 22 can be determined by assigning the transfer function P(z) of the plant 24 and the sensitivity function S(z) in the equation (4).

Accordingly, this embodiment defines the sensitivity function S(z) by the following equation (5). $\beta 1$ of the equation (5) is a sensitivity function parameter for defining the sensitivity function, which is set so as to meet the following condition B to be described later.

$$S(z) = 1 - \left(\frac{\beta 1}{z - (1 - \beta 1)}\right)^2 \tag{5}$$

The equation (5) is determined so as to meet the following conditions A and B.

A: The numerator order of the transfer function C must be less than the denominator order. In other words, the feedback function must be settable.

B: The steady-state deviation of the feedback control must be "0". In other words, the sensitivity function S must have high-pass filter properties that block low-frequency components.

Figure 3A:
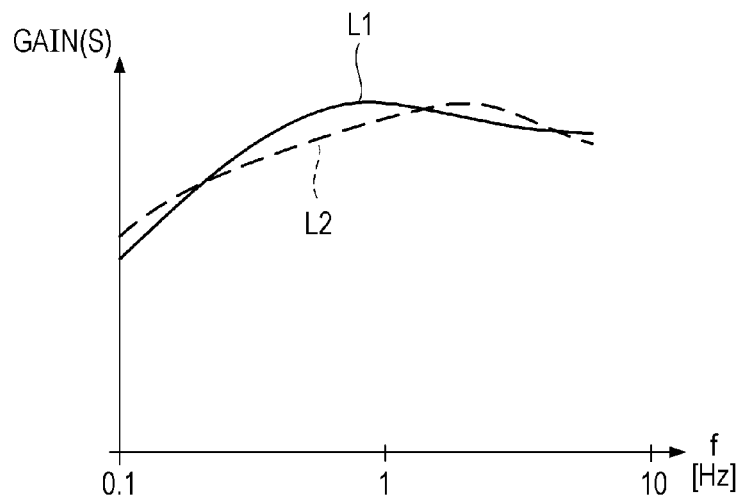
FIGS. 3A and 3B are charts showing amplitude-frequency characteristics of a sensitivity function (S) and a controller transfer function (C), respectively.

If the sensitivity function S is defined as described above, the amplitude-frequency characteristics of the sensitivity function S(z) are those indicated by the solid line L1 of FIG. 3A. Such characteristics become close to the amplitude-frequency characteristics (dotted line L2) of the sensitivity function SPID(z) in a control system where a PID (Proportional-Integral-Derivative) controller that is the most common feedback controller is used and its control gain is properly configured.

In this embodiment, the engine 1 and the LAF sensor 17 correspond to the plant 24 of FIG. 2. It has been experimentally confirmed that, in the air-fuel ratio control, the transfer characteristics of the engine 1 can be approximated by the transfer function of a dead time component corresponding to one arithmetic interval, and the transfer characteristics of the LAF sensor 17 can be approximated by the transfer function of a first-order lag element. Accordingly, the plant transfer function P(z) is given by the following equation (6). The a of the equation (6) is a response characteristic parameter indicating the response characteristics of the LAF sensor 17, which is defined by the following equation (7) using the response time constant $\tau S$ of the LAF sensor 17 and the arithmetic interval TC. The response characteristic parameter $\alpha$ takes values between 0 and 1, and becomes greater with higher response speeds of the LAF sensor 17.

$$P(z) = \frac{1}{z} \cdot \frac{\alpha}{z - (1 - \alpha)} \tag{6}$$

-continued $$\alpha = 1 - \exp\left(-\frac{TC}{\tau s}\right) \quad (7)$$

Accordingly, in this embodiment, the transfer function C(z) of the feedback controller 22 is given by the following equation (8), and substituting the sensitivity function S(z) of the equation (5) into the equation (8) results in the equation (9).

$$C(z) = \frac{1 - S(z)}{S(z)} \cdot \frac{z(z - (1 - \alpha))}{\alpha} \quad (8)$$

$$C(z) = \frac{\beta 1^2}{\alpha} \cdot \frac{z - (1 - \alpha)}{z - (1 - 2\beta 1)} \cdot \frac{z}{z - 1} \quad (9)$$

Figure 3B:
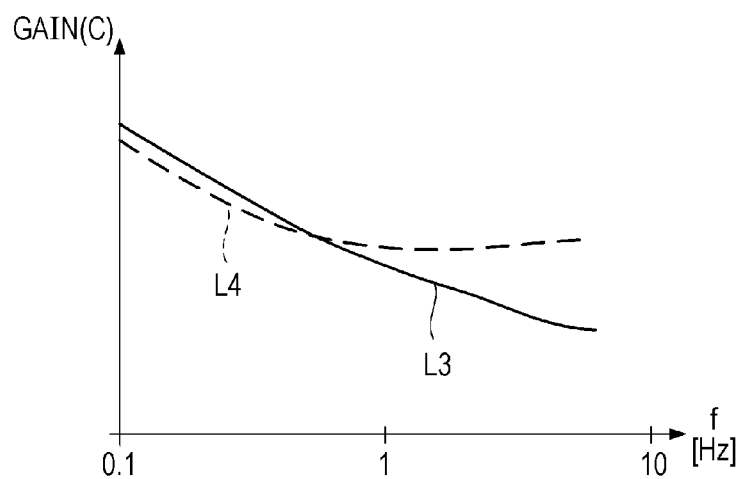

As shown by solid lines L3 of FIG. 3B, the amplitude-frequency characteristics of the transfer function C(z) given by the equation (9) can be regarded to be close to the amplitude-frequency characteristics (dotted lines L4) of the transfer function CPID(z) of the PID controller. However, in a frequency range over 1 Hz, GAIN (C) (solid lines L3) shows a tendency of becoming lower than GAIN (CPID) (dotted lines L4).

This embodiment achieves a better controllability by setting the sensitivity function parameter β1 of the equation (5) for defining the sensitivity function S(z) to the response characteristic parameter α of the LAF sensor 17 that is a constituent element of the plant 24. In other words, the sensitivity function S(z) to be applied to the equation (8) is defined by the following equation (5a), while the transfer function C(z) of the feedback controller 22 is given by the following equation (9a). The equation (9a) can be obtained by substituting β1 with a in the equation (9) (or by applying the equation (5a) to the equation (8)).

$$S(z) = 1 - \left(\frac{\alpha}{z - (1 - \alpha)}\right)^2 \quad (5a)$$

$$C(z) = \frac{\alpha z}{z - 1} \cdot \frac{z - (1 - \alpha)}{z - (1 - 2\alpha)} \quad (9a)$$

Figure 4:
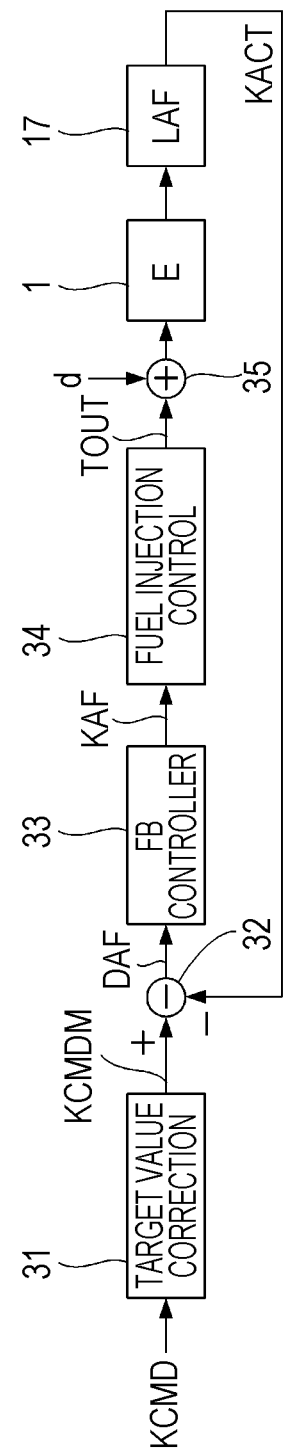
FIG. 4 is a block diagram showing a configuration of a control system that performs air-fuel ratio feedback control.

FIG. 4 is a block diagram showing an overall configuration of a feedback control system in this embodiment, which includes a target value corrector (corrected target value calculation unit) 31, a subtractor 32, a feedback controller 33, a fuel injection control section 34, an adder 35, an engine 1, and an LAF sensor 17. The target value corrector 31, the subtractor 32, the feedback controller 33, and the fuel injection control section 34 are implemented through arithmetic processing by the CPU of the ECU 5. In this embodiment, an equivalent ratio is used as a parameter indicating an air-fuel ratio. The equivalent ratio is proportional to a reciprocal number of an air-fuel ratio and is a parameter that takes "1.0" when the air-fuel ratio is equal to the stoichiometric air-fuel ratio.

The target value corrector 31 applies the plant transfer function P(z) (the equation (6) above) to a target equivalent ratio KCMD corresponding to a target air-fuel ratio and thereby calculates a corrected target equivalent ratio KCMDM. Specifically, it is given by the following equation (10). "k" of the equation (10) is a discretization time discretized by the arithmetic interval TC.

$$KCMDM(k)=(1-\alpha)\times KCMDM(k-1)+\alpha\times KCMD(k-2) \quad (10)$$

Figure 5:
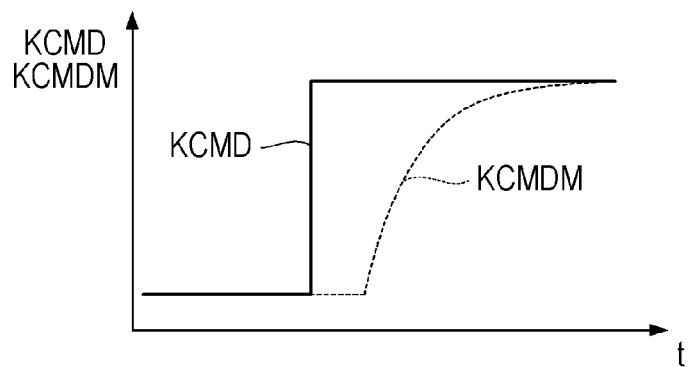
FIG. 5 is a time chart describing a function of a target value corrector of FIG. 4.

For example, if the target equivalent ratio KCMD changes in a step-like manner as shown by solid lines in FIG. 5, the corrected target equivalent ratio KCMDM delays by a dead time component (approximated by the arithmetic interval TC), as shown by dotted lines, and changes so as to match the target equivalent ratio KCMD in the first-order lag characteristics.

The subtractor 32 calculates a deviation DAF by subtracting a detected equivalent ratio KACT from the corrected target equivalent ratio KCMDM. The detected equivalent ratio KACT is a value obtained by converting an air-fuel ratio detected by the LAF sensor 17 into an equivalent ratio.

The feedback controller 33 executes an operation corresponding to the transfer function C(z) of the equation (9) and thereby calculates an air-fuel ratio correction coefficient KAF that is an air-fuel control amount. In other words, the air-fuel ratio correction coefficient KAF is calculated by carrying out an operation corresponding to the following equation (11) using the transfer function C(z), more specifically, by carrying out an operation shown by the equation (12). In this embodiment, since the sensitivity function parameter β1 of the sensitivity function S(z) is set to the response characteristic parameter α of the LAF sensor 17, as described above, the air-fuel ratio correction coefficient KAF is actually calculated by the equation (12a).

$$KAF = C(z) \cdot DAF \quad (11)$$

$$KAF(k) = 2(1 - \beta 1) \cdot KAF(k-1) + (2\beta 1 - 1) \cdot KAF(k-2) + \quad (12)$$
$$\frac{\beta 1^2}{\alpha} \cdot DAF(k) + \frac{\beta 1^2(\alpha - 1)}{\alpha} \cdot DAF(k-1)$$

$$KAF(k) = 2(1 - \alpha) \cdot KAF(k-1) + \quad (12a)$$
$$(2\alpha - 1) \cdot KAF(k-2) + \alpha \cdot DAF(k) + \alpha(\alpha - 1) \cdot DAF(k-1)$$

The fuel injection control section 34 calculates a fuel injection amount TOUT by the following equation (13).

$$TOUT=TIM\times KCMD\times KAF\times KTOTAL \quad (13)$$

where TIM is a basic amount of fuel, specifically, a basic fuel injection duration of the fuel injection valve 6, which is determined by searching a TIM table that is configured according to an intake air flow rate GAIR. The TIM table is configured in such a manner that the air-fuel ratio of an air-fuel mixture to be supplied to an engine is substantially equal to the stoichiometric air-fuel ratio.

KTOTAL is a product of correction coefficients calculated according to operating condition parameters such as an intake temperature TA and an engine coolant temperature TW and is calculated by a known method.

The adder 35 is included in the same sense as that of FIG. 2, which adds a disturbance d applied to the engine 1 and the LAF sensor 17 both of which constitute the plant.

As compared to that of FIG. 2, the control system shown in FIG. 4 contains an addition of a fuel injection control section 34 to the feedback control loop. Since the fuel injection control section 34 performs a linear operation only, a design approach of the feedback control described above can be applied without any change.

Figure 6:
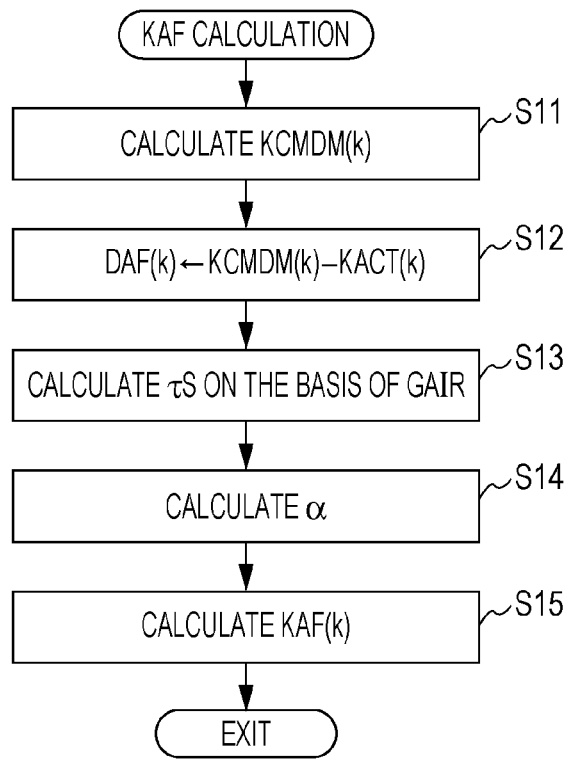
FIG. 6 is a flowchart for arithmetic processing by a feedback controller of FIG. 4.

FIG. 6 is a flowchart for arithmetic processing in the feedback controller 33 of FIG. 4. This processing is executed by the CPU of the ECU 5 in synchronization with a TDC pulse, causing the arithmetic interval TC to change depending on an engine speed NE. Accordingly, The arithmetic interval TC to be applied to calculation of the response characteristic parameter α includes a value calculated on the basis of the engine speed NE.

Step S11 calculates the corrected target equivalent ratio KCMDM(k) by the equation (10), while step S12 calculates the deviation DAF(k) by the following equation (14).

$$DAF(k)=KCMDM(k)-KACT(k) \tag{14}$$

Figure 7:
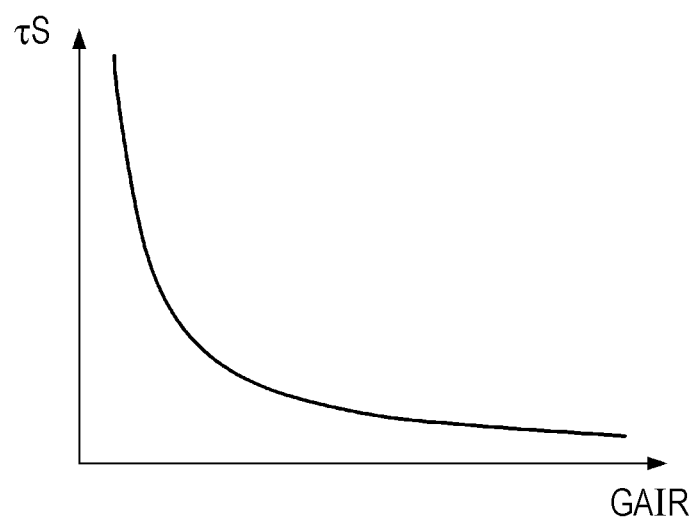
FIG. 7 is a diagram showing a table that is referenced in processing steps of FIG. 6.

Step S13 retrieves a τS table shown in FIG. 7 on the basis of an intake air flow rate GAIR and thereby calculates the response time constant τS of the LAF sensor 17. In the TS table, the large intake air flow rate GAIR is configured to result in the smaller response time constant τS.

Step S14 calculates the response characteristic parameter α by the equation (7) and step S15 calculates the air-fuel ratio correction coefficient KAF(k) by the equation (12a).

Figure 8A:
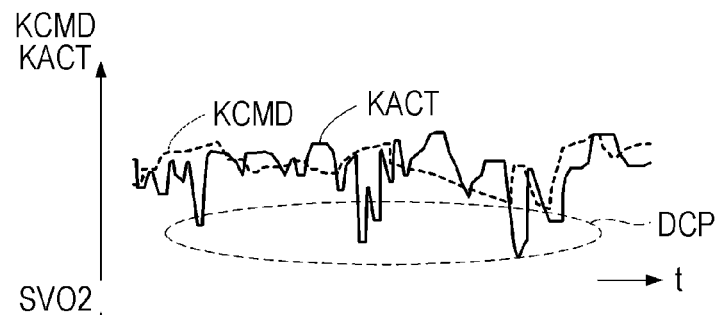
FIGS. 8A to 8F are time charts describing a control performance of feedback control.
Figure 8B:
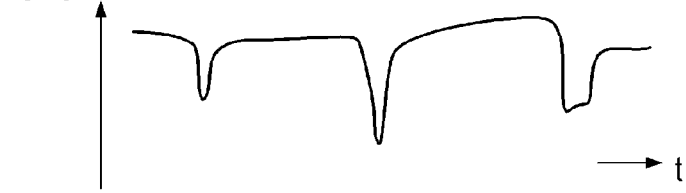
Figure 8C:
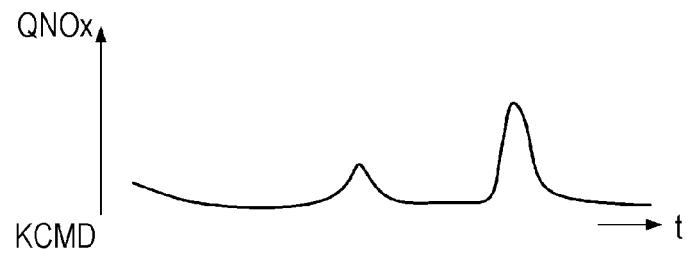
Figure 8D:
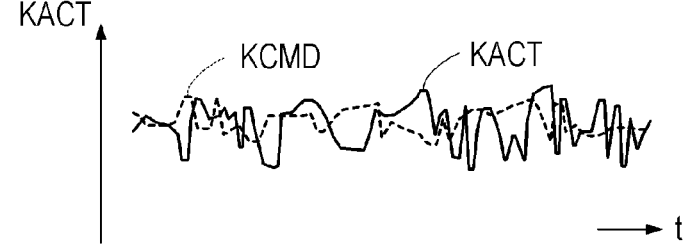
Figure 8E:
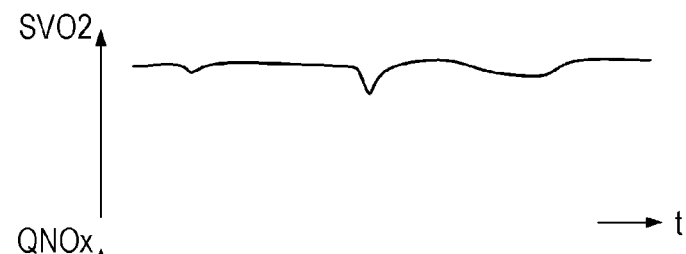
Figure 8F:
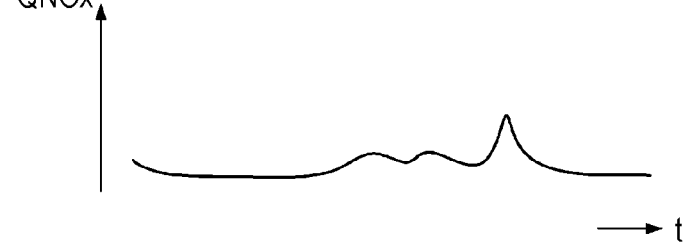

FIGS. 8A to 8F are time charts describing an improvement in air-fuel control characteristics in this embodiment. FIGS. 8A to 8C show the control characteristics of a conventional controller, depicting the target equivalent ratio KCMD and a detected equivalent ratio KACT, a downstream sensor output SVO2, and NOx emission QNOx, respectively. FIGS. 8D to 8F show the control characteristics of this embodiment. The downstream sensor output SVO2 shows a downstream oxygen concentration of the exhaust emission control catalyst 14, and the smaller sensor output value indicates the higher oxygen concentration.

In areas enclosed by dotted lines DCP in FIG. 8A, the detected equivalent ratio KACT greatly drops as compared to the target equivalent ratio KCMD, resulting in deteriorated control performance. Such deteriorated control performance is expressed by a rapid change in the downstream sensor output SVO2 and an increase in NOx emission QNOx.

In contrast, this embodiment experiences no significant drop in the detected equivalent ratio KACT, and thus prevents a change in the downstream sensor output SVO2 and an increase in the NOx emission QNOx, thereby allowing a good control performance to be achieved.

In this embodiment, the feedback controller 33 determines the air-fuel ratio correction coefficient KAF so that the detected equivalent ratio KACT coincides with the corrected target equivalent ratio KCMDM, and the transfer function C(z) of the feedback controller 33 is expressed by a product of an inverse function (1/P(z)) of a transfer function P(z) of a control target model to be obtained by modeling the engine 1 and the LAF sensor 17 and a disturbance sensitivity correlation function ((1−S(z))/S(z)) defined using the sensitivity function S(z), and the sensitivity function parameter β1 is set to the response characteristic parameter α. In other words, the sensitivity function S(z) is defined by using the response characteristic parameter α that indicates the response characteristics of the LAF sensor 17. Accordingly, finding the response characteristic parameter α determines the sensitivity function S(z) and in addition determines the controller transfer function C(z) of the feedback controller 33. The use of the sensitivity function S(z) prevents the effect of a disturbance and at the same time gives the controller transfer function C(z) suitable for the response characteristics of the LAF sensor 17. As a result, a good control performance can be achieved while design man-hour is kept under control.

Also, the sensitivity function S(z) is defined so that the numerator order of the controller transfer function C(z) is lower than the denominator order of the controller transfer function C(z) and the high-pass filter properties are achieved, thereby structuring a viable, steady-error free feedback controller.

Furthermore, this embodiment calculates the corrected target equivalent ratio KCMDM by applying the transfer function P(z) of a control target model to the target equivalent ratio KCMD, and calculates the air-fuel ratio correction coefficient KAF so that the detected equivalent ratio KACT matches the corrected target equivalent ratio KCMDM. Applying the corrected target equivalent ratio KCMDM can control a difference between the detected equivalent ratio KACT and the corrected target equivalent ratio KCMDM associated with a rapid change to the target equivalent ratio KCMD, namely, an element arising from a dead time component and a first-order lag element contained in the deviation DAF. As a result, unnecessary changes in the air-fuel ratio correction coefficient KAF associated with a transient state can be controlled, thereby allowing a good control performance to be maintained.

Modified Embodiment

The embodiment described above configures a feedback controller by approximating plant response characteristics by one response characteristic parameter α, which raises concerns about a shortfall in control performance in a high frequency range, as shown in FIGS. 3A and 3B. For this, this modified embodiment defines the sensitivity function S(z) as a linear sum of a first sensitivity function S1(z) defined using a first sensitivity function parameter β1 and a second sensitivity function S2(z) defined using a second sensitivity function parameter β2. Description of the modified embodiment is the same as those of the embodiment described above, except the following.

The sensitivity function S(z) is defined by the following equation (21), while the first sensitivity function S1(z) and the second sensitivity function S2(z) are defined by the following equations (22) and (23), respectively. "k1" and "k2" of the equation (21) are weighting factors, and a sum of the weighting factors k1 and k2 is "1.0". The equation (22) is the equation (5) whose "S" is substituted with "S1", while the equation (23) is the equation (22) whose "S1" and "β1" are substituted with "S2" and "β2", respectively. The second sensitivity function parameter β2 is configured so as to meet the condition B above and take a value different from the first sensitivity function parameter β1.

$$S(z) = k1 \cdot S1(z) + k2 \cdot S2(z) \tag{21}$$

$$S1(z) = 1 - \left(\frac{\beta 1}{z - (1 - \beta 1)}\right)^2 \tag{22}$$

$$S2(z) = 1 - \left(\frac{\beta 2}{z - (1 - \beta 2)}\right)^2 \tag{23}$$

If the first control transfer function C1(z) and the second control transfer function C2(z) are defined by the following equations (24) and (25), respectively, the controller transfer function C(z) is given by the equation (26).

$$C1(z) = \frac{1 - S1(z)}{S1(z)} \cdot \frac{1}{P(z)} \tag{24}$$

$$C2(z) = \frac{1 - S2(z)}{S2(z)} \cdot \frac{1}{P(z)} \tag{25}$$

$$C(z) = \frac{1-S(z)}{S(z)} \cdot \frac{1}{P(z)} \qquad (26)$$

$$= \frac{k1 \cdot (1-S1(z)) + k2 \cdot (1-S2(z))}{k1 \cdot S1(z) + k2 \cdot S2(z)} \cdot \frac{1}{P(z)}$$

$$= \frac{k1 \cdot S1(z) \cdot C1(z) + k2 \cdot S2(z) \cdot C2(z)}{k1 \cdot S1(z) + k2 \cdot S2(z)}$$

Using a weighting function W(z) defined by the following equation (27), the equation (26) can be changed to:

$$W(z) = \frac{k1 \cdot S1(z)}{k1 \cdot S1(z) + k2 \cdot S2(z)} \qquad (27)$$

$$C(z) = W(z) \cdot C1 + (1 - W(z)) \cdot C2(z) \qquad (28)$$

Figure 9A:
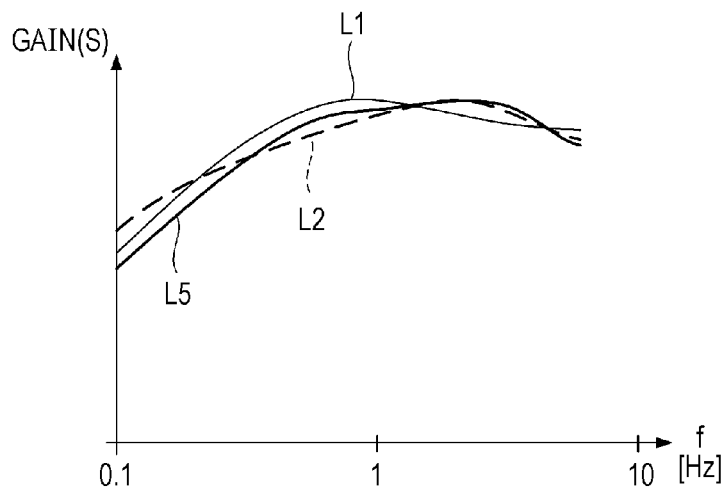
FIGS. 9A and 9B are charts showing amplitude-frequency characteristics of a sensitivity function (S) and a controller transfer function (C), respectively.

Accordingly, if the sensitivity function S(z) is defined as a linear sum of the two sensitivity functions S1(z) and S2(z), the controller transfer function C(z) can be determined by the equation (28) so that the amplitude-frequency characteristics of the sensitivity function S(z) are those indicated by solid lines L5 of FIG. 9A.

This modified embodiment can attain a good control performance by setting the first sensitivity function parameter β1 to the response characteristic parameter α of the LAF sensor 17 and setting the second sensitivity function parameter β2 to a response characteristic parameter α' (hereinafter referred to as "high-pass response characteristic parameter") greater than the response characteristic parameter α. The high-pass response characteristic parameter α' is a parameter that indicates the response characteristics of the LAF sensor 17 in a high-frequency band (frequency band over 1 Hz), which is given by the following equation (7a). "τ'S" of the equation (7a) is a time constant associated with the case where an ideal gas replacement is carried out in the LAF sensor 17.

$$\alpha' = 1 - \exp(-TC/\tau's) \qquad (7a)$$

It is known that the time constant is of the LAF sensor 17 is greatly dependent on gas replacement in sensor cover or sensor element portions. The time constant τ's associated with an ideal gas replacement is smaller than the time constant is associated with an average gas replacement (τ's<τs). Accordingly, the high-pass response characteristic parameter α' takes a value greater than the response characteristic parameter α. The time constant τ's may be determined as a time constant is associated with a sufficiently large exhaust flow (intake air flow GAIR) because the larger exhaust flow improves the ability to replace gas in the LAF sensor 17.

Figure 9B:
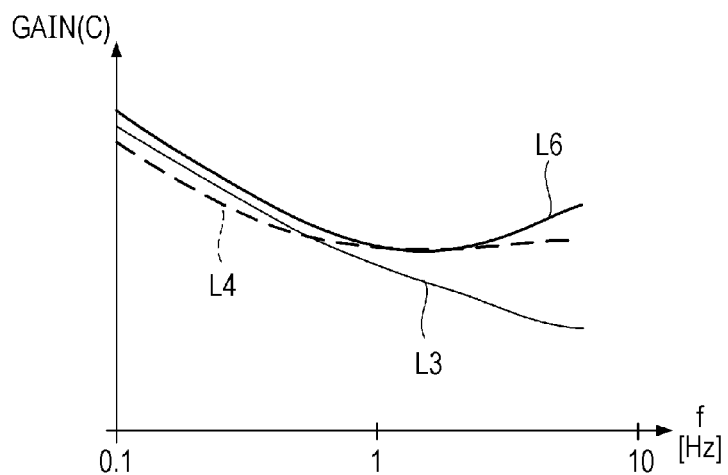

The amplitude-frequency characteristics of the controller transfer function C(z) can be made those indicated by solid lines L6 of FIG. 9B by applying the response characteristic parameter α and the high-pass response characteristic parameter α', thereby allowing the control performance to be improved in a high frequency range. FIGS. 9A and 9B also show lines L1 to L4 shown in FIGS. 3A and 3B for comparison purposes.

As described above, in this modified embodiment, the sensitivity function S(z) is defined as a linear sum of the sensitivity functions S1(z) and S2(z), and the two corresponding sensitivity function parameters β1 and β2 are set respectively to the two response characteristic parameter α and α' that indicate the response characteristics of the LAF sensor 17. To deal with variations in gas replacement in the LAF sensor 17, the sensitivity function S(z) is defined as a linear sum of the sensitivity functions S1(z) and S2(z), thereby allowing a good control performance to be achieved over a wider frequency range. In other words, the good control performance can be achieved despite the variations in gas replacement.

Although the calculation equation for the air-fuel correction coefficient KAF(k) according to the modified embodiment is expressed by a linear sum of KAF(k−1), KAF(k−2), DAF(k), and DAF(k−1), like the above equation (12), the calculation formula for the coefficient is very complicated. For this, in this embodiment the equation (28) is transformed into a format shown in the block diagram of FIG. 10 and the steps shown in FIG. 11 are used to calculate the air-fuel correction coefficient KAF(k).

Figure 10:
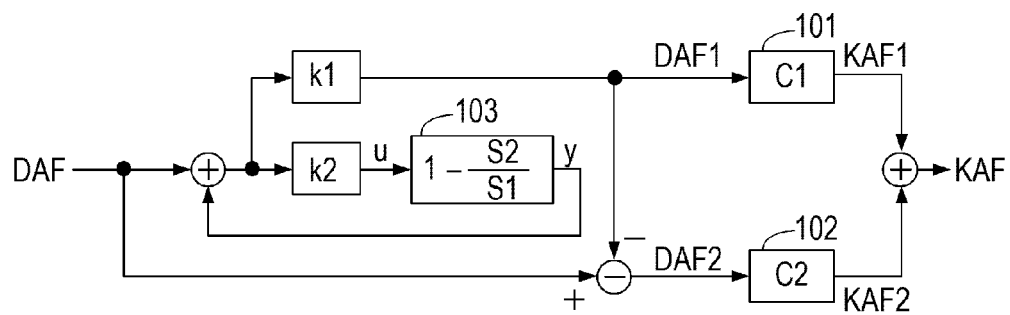
FIG. 10 is a block diagram describing arithmetic processing in a modified example of a first embodiment.
Figure 11:
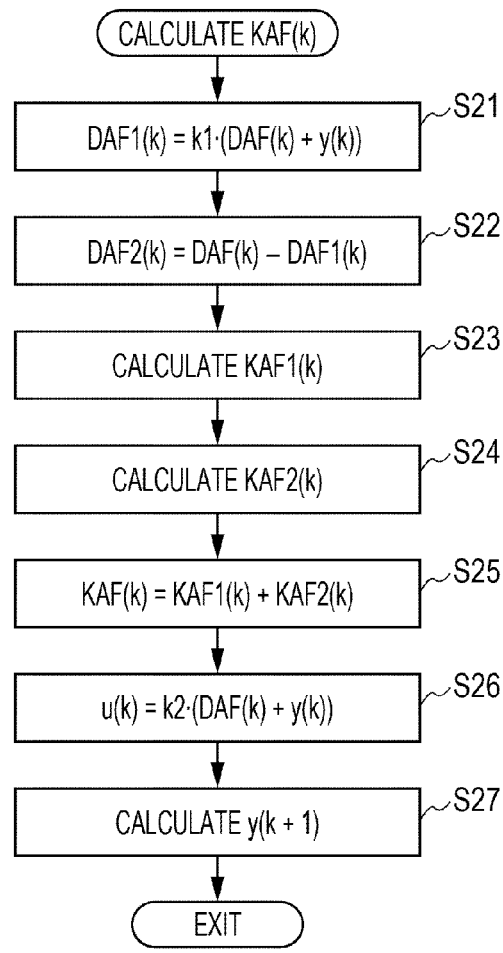
FIG. 11 is a flowchart for arithmetic processing associated with a block diagram of FIG. 10.

In FIG. 10, a section in which a calculation equation transitions to a recurrence formula is divided into three blocks 101 through 103. A first deviation DAF1 to be input to the block 101 is calculated by applying a weighting function W(z) to the deviation DAF, while a second deviation DAF2 to be input to the block 102 is calculated by applying a weighting function (1−W(z)) to the deviation DAF. As a reference to the equations (11) and (12) clearly shows, a first correction coefficient KAF1 that is an output from the block 101 and a second correction coefficient KAF2 that is an output from the block 102 are given by the equations (31) and (32). However, the first and second correction coefficients KAF1 and KAF2 are calculated as β1=α and β2=α', respectively, in this modified embodiment.

$$KAF1(k) = 2(1-\beta1) \cdot KAF1(k-1) + (2\beta1-1) \cdot KAF1(k-2) + \qquad (31)$$
$$\frac{\beta1^2}{\alpha} \cdot DAF1(k) + \frac{\beta1^2(\alpha-1)}{\alpha} \cdot DAF1(k-1)$$

$$KAF2(k) = 2(1-\beta2) \cdot KAF2(k-1) + (2\beta2-1) \cdot KAF2(k-2) + \qquad (32)$$
$$\frac{\beta2^2}{\alpha} \cdot DAF2(k) + \frac{\beta2^2(\alpha-1)}{\alpha} \cdot DAF2(k-1)$$

The output parameter y(k+1) of the block 103 is given by the following equation (33) using an input parameter u.

$$y(k+1) = \qquad (33)$$
$$(3 - 2(\beta1+\beta2)) \cdot y(k) - ((1-\beta2)^2 + 2(1-2\beta1)(1-\beta2)) \cdot y(k-1) +$$
$$(1-2\beta1)(1-\beta2)^2 \cdot y(k-2) + (\beta2-\beta1)(\beta2+\beta1) \cdot u(k-1) -$$
$$(\beta2-\beta1)(\beta2+\beta1-2\beta1\beta2) \cdot u(k-2)$$

Using parameter y(k), the first deviation DAF1 is given by the following equation (34), and the second deviation DAF2 is given by the following equation (35) using the first deviation DAF1 (see FIG. 10). The calculation of the equations (34) and (35) corresponds to the calculation to which the weighting functions W(z) and (1−W(z)) are applied.

$$DAF1(k) = k1 \times (DAF(k) + y(k)) \qquad (34)$$

$$DAF2(k) = DAF(k) - DAF1(k) \qquad (35)$$

Steps S21 and S22 of FIG. 11 carry out an operation of the equations (34) and (35) above, respectively, to determine the first and second deviations DAF1(k) and DAF2(k). Steps S23 and 24 carry out an operation of the equations (31) and (32) above, respectively, to determine the first and second correction coefficients KAF1(k) and KAF2(k). Step S25 adds the first and second correction coefficients KAF1(k) and KAF2(k) to determine the air-fuel ratio correction coefficient KAF(k).

Steps S26 and S27 perform a parameter u(k) and y(k+1) calculation, respectively, for the preparation of the next calculation.

The air-fuel ratio correction coefficient KAF(k) is determined as described above.

Second Embodiment

Figure 12:
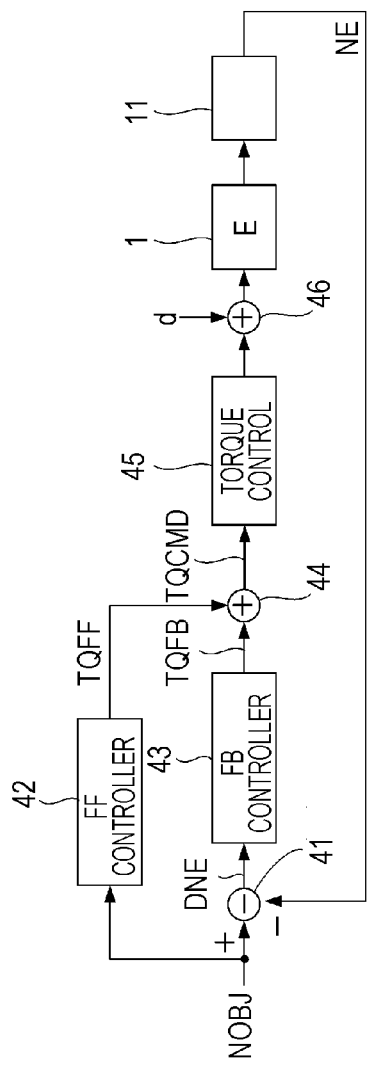
FIG. 12 is a block diagram showing a configuration of a control system that performs feedback control of an internal combustion engine idle speed.

A second embodiment applies the above-mentioned configuration approach for a feedback controller to a feedback controller that performs feedback control of the idle speed of the engine 1. FIG. 12 shows a configuration of a control system according to this embodiment.

The control system shown in FIG. 12 includes a subtractor 41, a feedforward controller 42, a feedback controller 43, an adder 44, a torque control section 45, an adder 46, an engine 1, and an engine speed sensor (corresponding to a crank angle position sensor according to the first embodiment) 11.

The subtractor 41 calculates a deviation DNE by subtracting a detected engine speed NE from a target speed NOBJ. The feedforward controller 42 calculates a feedforward control item TQFF by applying a transfer function CFF(z) to the target speed NOBJ.

The feedback controller 43 calculates a feedback control item TQFB by applying a transfer function CFB(z) to the deviation DNE. The adder 44 adds the feedforward control item TQFF and the feedback control item TQFB to calculate a target torque TQCMD.

The torque control section 45 performs torque control of the engine 1 so as to achieve the target torque TQCMD (namely, so that the output torque TRQ of the engine 1 matches the target torque TQCMD). Specifically, the intake airflow to the engine 1 is controlled by changing the opening of the throttle valve 3 using an actuator (not illustrated), thereby controlling the output torque TRQ of the engine 1. The adder 46 is included in the same sense as the adder 35 (FIG. 4) according to the first embodiment.

The sensitivity function S(z) of a closed-loop included in this control system is given by the following equation (41). P(z) of the equation (41) is the transfer function of a plant that includes the torque control section 45, the engine 1, and the engine speed sensor 11. From the equation (41), the transfer function CFB(z) of the feedback controller 43 is given by the following equation (42).

$$S(z) = 1/(1 + CFB(z) \cdot P(z)) \quad (41)$$

$$CFB(z) = \frac{1 - S(z)}{S(z)} \cdot \frac{1}{P(z)} \quad (42)$$

Using the sensitivity function S(z), the engine speed NE that is a control output is given by the following equation (43).

$$NE = \{CFF \cdot S(z) \cdot P(z) + (1 - S(z))\} \cdot NOBJ + S(z) \cdot P(z) \cdot d \quad (43)$$

Next, a plant transfer function P(z) is described below.

The transfer function GTOD(z) of the torque control section 45 can be approximated by a first-order lag element and be given by the following equation (44). "α1" of the equation (44) is a response characteristic parameter and is determined, on the basis of the control response characteristics of an intake air flow.

$$GTOD(z) = \frac{\alpha 1}{z - (1 - \alpha 1)} \quad (44)$$

Since the relationship between the engine speed NE and the output torque TRQ is given by the following equation (45), the transfer function GTN(z) from the output torque TRQ to the engine speed NE is given by the following equation (46). "IE" of the equation (45) is the moment of inertia of the engine 1 and "K" is a friction coefficient. "α2" of the equation (46) is a response characteristic parameter given by the following equation (47).

$$IE \cdot \frac{dNE}{dt} = TRQ - K \cdot NE \quad (45)$$

$$GTN(z) = \frac{1}{K} \cdot \frac{\alpha 2}{z - (1 - \alpha 2)} \quad (46)$$

$$\alpha 2 = 1 - \exp\left(-\frac{TC}{IE/K}\right) \quad (47)$$

From the equations (44) and (46), the plant transfer function P(z) is given by the following equation (48). The engine speed sensor is approximated as those containing no dead time element and integral element.

$$P(z) = \frac{1}{K} \cdot \frac{\alpha 1}{z - (1 - \alpha 1)} \cdot \frac{\alpha 2}{z - (1 - \alpha 2)} \quad (48)$$

The denominator order of this transfer function P(z) is 2, which is the same as those in the first embodiment. For this, as is the case with the first embodiment, the sensitivity function S(z) can be defined by the equation (5) above.

Accordingly, the transfer function CFB(z) of the feedback controller is obtained by applying the equations (48) and (5) to the equation (42), allowing the feedback controller 43 to be designed in the same manner as the first embodiment. Preferably, the sensitivity function parameter β1 is set to the response characteristic parameter α1 in this embodiment, because the friction coefficient K is actually small and the effect of the response characteristic parameter α2 is very minor as compared to the response characteristic parameter α1.

Modified Embodiment 1

Assuming that the friction coefficient K of the equation (45) is ignorable by compensating the effect of friction on the engine 1 by the torque control section, the following equation (45a) can be obtained. Accordingly, the transfer function GTN(z) from the output torque TRQ to the engine speed NE is given by the following equation (50), and the plant transfer function P(z) is given by the following equation (51). Preferably, the sensitivity function parameter β1 is also set to the response characteristic parameter α1 in this embodiment.

$$IE \cdot \frac{dNE}{dt} = TRQ \quad (45a)$$

$$GTN(z) = \frac{1}{IE} \cdot \frac{1}{z - 1} \quad (50)$$

-continued $$P(z) = \frac{1}{IE} \cdot \frac{\alpha 1}{z-(1-\alpha 1)} \cdot \frac{1}{z-1} \quad (51)$$

Modified Embodiment 2

The transfer function P(z) expressed by the equations (48) and (50) contains no dead time component. However, if the use of a control target mode containing a dead time component is appropriate, the sensitivity function S(z) is defined by, for example, the following equation (52) since the denominator order of the sensitivity function P(z) increases, thereby obtaining the sensitivity function S(z) meeting the aforementioned conditions A and B.

$$S(z) = 1 - \left(\frac{\beta 1}{z-(1-\beta 1)}\right)^3 \quad (52)$$

Modified Embodiment 3

In this embodiment, the sensitivity function S(z) may also be defined as a linear sum of the two sensitivity functions S1(z) and S2(z), as is the case with the modified embodiment of the first embodiment.

In this case, preferably the first sensitivity function parameter β1 and the second sensitivity function parameter β2 are configured in the following manner.

Since there are variations in actual response characteristic parameter α1 values that indicate the response characteristics of the torque control section 45, the first sensitivity function parameter β1 is set to α1MIN, the response characteristic parameter α1 value corresponding to the assumed slowest response speed, while the second sensitivity function parameter β2 is set to α1AV, the response characteristic parameter α1 value corresponding to the average response speed.

With these settings of the first and sensitivity function parameters β1 and β2, a good control performance can be obtained despite the variations in response characteristics of the torque control section 45.

Third Embodiment

Figure 13:
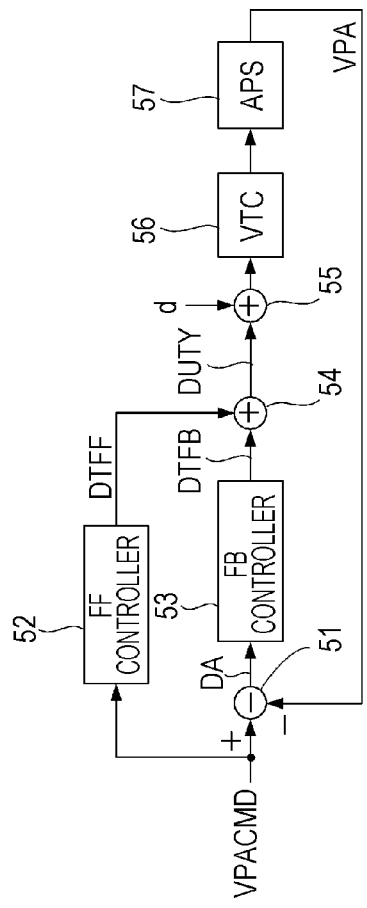
FIG. 13 is a diagram showing a configuration of a control system that performs feedback control of operational phase of an intake valve.

A third embodiment applies the above-mentioned configuration approach for a feedback controller to a controller for a valve operational phase varying mechanism (hereinafter referred to as "VTC mechanism") that continuously varies the operational phase of an engine intake valve, in particular, to a feedback controller that performs feedback control of valve operational phase VPA. FIG. 13 shows a configuration of a control system according to this embodiment.

The control system shown in FIG. 13 includes a subtractor 51, a feedforward controller 52, a feedback controller 53, adders 54, 55, a VTC mechanism 56, and an angle position sensor (APS) 57.

The subtractor 51 calculates a deviation DA by subtracting a detected operational phase VPA from a target operational phase VPACMD. The feedforward controller 52 calculates a feedforward control item DTFF by applying a transfer function CFF(z) to the target operational phase VPACMD.

The feedback controller 53 calculates a feedback control item DTFB by applying a transfer function CFB(z) to the deviation DA. The adder 54 adds the feedforward control item DTFF and the feedback control item DTFB to calculate a control duty DOUT. The adder 55 is included in the same sense as the adder 35 (FIG. 4) according to the first embodiment.

The sensitivity function S(z) of a closed-loop included in this control system is also given by the equation (41) above. The plant is constructed of a VTC mechanism 56 and an angle position sensor 57. The angle position sensor 57 can be approximated as those containing no dead time element and integral element.

Control of the valve operational phase VPA in the VTC mechanism 56 is performed by using an electromagnetic spool valve shown in FIG. 14. The electromagnetic spool valve includes a cylinder member 61 having a spool 62 inserted thereinto, a spring 63 for biasing the spool 62 in the left direction of the figure, and a solenoid 64. The cylinder member 61 has drains 65, 66 provided therein.

The solenoid 64 biases the spool 62 in the right direction of the figure, and the spool 62 comes to a stop at a position at which the rightward biasing force of the solenoid 64 and the leftward biasing force of the spring 63 are balanced. Accordingly, a current to be supplied to the solenoid 64 controls the position 63 of the spool 62.

An operating fluid pressurized by an oil pump (not illustrated) is supplied to the cylinder member 61 through an oil passage 67. Then, such an operating fluid is delivered to a lag angle chamber or an advance angle chamber (not illustrated) via an oil passage 68 or 69.

Figure 14A:
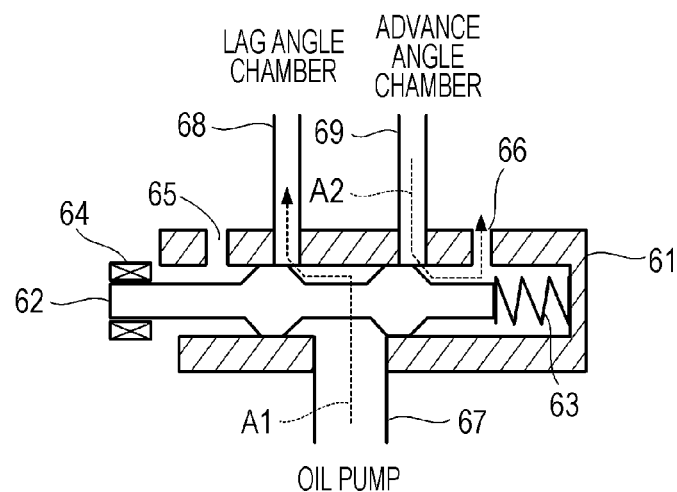
FIGS. 14A to 14C are diagrams describing a structure and operation of an electromagnetic spool valve contained in a valve operating characteristics varying mechanism.
Figure 14B:
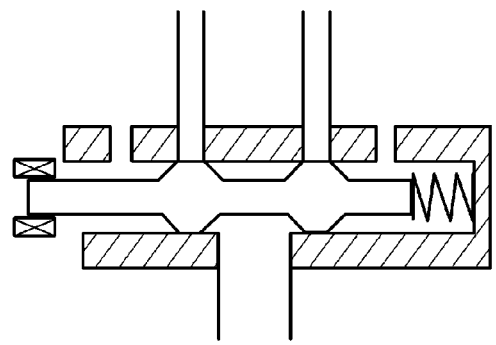

FIG. 14B shows a state where the spool 62 is located at a position (hereinafter referred to as "blocking position") PSC at which both of the oils passages 68 and 69 are blocked by the spool 62. In such a state, the oil pressure in the lag angle chamber and the advance angle chamber is maintained, making the valve operational phase VPA constant.

FIG. 14A shows a state where a spool position PS is moved leftward from the blocking position PSC. In such a state, the operating fluid supplied through the oil passage 67 is delivered to the lag angle chamber through the oil passage 68, as shown by dotted lines A1, and at the same time the operating fluid inside of the advance angle chamber is discharged through the oil passage 69 and the drain 66, as shown by dotted lines A2. As a result, the valve operational phase changes in the direction of a lag angle.

Figure 14C:
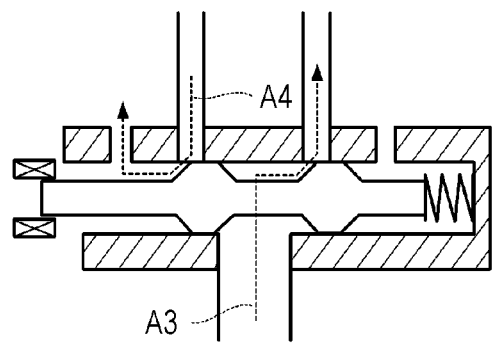

FIG. 14C shows a state where a spool position PS is moved rightward from the blocking position PSC. In such a state, the operating fluid supplied through the oil passage 67 is delivered to the advance angle chamber through the oil passage 69, as shown by dotted lines A3, and at the same time the operating fluid inside of the lag angle chamber is discharged through the oil passage 68 and the drain 65, as shown by dotted lines A2. As a result, the valve operational phase changes in the direction of an advance angle.

If a drive signal duty when the spool position PS is located at the blocking position is defined as a reference duty DTO and a difference between the reference duty DTO and a drive signal duty DUTY that is actually supplied is defined as a control duty DOUT (direction of an advance angle is defined as plus), the operating fluid in amount proportional to the control duty DOUT flows and the total amount of the operating fluid determines the valve operational phase VPA.

Consequently, a transfer function from the control duty DOUT to the valve operational phase VPA, namely, the transfer function P(z) of the plant according to this embodiment is given by the following equation (61). "KC" of the equation (61) is a conversion coefficient for matching a dimension and "α3" is a response characteristic parameter of the plant, which is mainly determined by the response characteristics of the operating fluid.

$$P(z) = KC \cdot \frac{1}{z-1} \cdot \frac{\alpha 3}{z-(1-\alpha 3)} \tag{61}$$

This transfer function P(z) is substantially the same as the transfer function (equation (51)) of a modified embodiment according to the second embodiment, and the sensitivity function S(z) can also be defined by the equation (51). In this embodiment, preferably the sensitivity function parameter β1 is set to the response characteristic parameter α3.

In this embodiment, a lubricant of an engine in which the VTC mechanism is mounted is used as the operating fluid. For this, it is preferable that the response characteristic parameter α3 is set by retrieving a map that is configured in advance on the basis of an engine speed and an engine coolant temperature.

In a control system that controls the VTC mechanism as described above, a feedback controller can be configured in the same manner as the first embodiment. If a difference between the numerator order and the denominator order of the plant transfer function increases, the sensitivity function S(z) may be configured to meet the conditions A and B described above (for example, the denominator order is increased), as is the case with a modified embodiment of the first embodiment.

Modified Embodiment

In this embodiment, to deal with significant variations in the response characteristic parameter α3 that indicates the response characteristics of the operating fluid, the sensitivity function S(z) may also be defined as a linear sum of the two sensitivity functions $S1(z)$ and $S2(z)$, as is the case with the modified embodiment of the first embodiment.

In this case, preferably the first sensitivity function parameter β1 and the second sensitivity function parameter β2 are configured in the following manner.

More specifically, the first sensitivity function parameter β1 is set to α3MIN, the response characteristic parameter α3 value corresponding to the assumed slowest response speed, while the second sensitivity function parameter β2 is set to α3AV, the response characteristic parameter α3 value corresponding to the average response speed.

With these settings of the first and sensitivity function parameters β1 and β2, a good control performance can be obtained despite the variations in response characteristics of the operating fluid.

The present invention is typically described with reference to, but not limited to, the foregoing preferred embodiments. Various modifications are conceivable. For example, a plant to be subjected to control is not limited to those described above, and the present invention can be applied to other various feedback controls to be subjected to control.

In the first embodiment, the target value corrector 31 may be omitted and the target equivalent ratio KCMD may be directly input to the subtractor 32. In the modified embodiment of the first embodiment, although the sensitivity function S(z) is defined as a linear sum of the two sensitivity functions $S1(z)$ and $S2(z)$, the definition is not limited to this. The sensitivity function S(z) may be defined as a linear sum of three or more sensitivity functions.

Also, in the second embodiment, the feedforward controller 42 may be omitted, and an output from the feedback controller 43 may be input as a control input (TQCMD) to the torque control section 45. Likewise, in Embodiment 3, the feedforward controller 52 may be omitted, and an output from the feedback controller 53 may be input as a control input (DUTY) to the VTC mechanism 56.

According to the embodiment of the present invention, a plant controller is provided with a feedback controller that calculates a control input (KAF) to a plant so that a control output (KACT) of the plant matches a target value (KCMD). A controller transfer function (C(z)) that is a transfer function of the feedback controller is expressed by a product of an inverse transfer function of a transfer function (P(z)) of a control target model to be obtained by modeling the plant and a disturbance sensitivity correlation function to be defined using a sensitivity function (S(z)) that indicates the sensitivity of a disturbance to be applied to the plant to the control output, and the sensitivity function (S(z)) is defined by using a response characteristic parameter (α) that indicates the response characteristic of the plant.

Accordingly, calculating the response characteristic parameter determines the sensitivity function and moreover determines the control transfer function of the feedback controller. The use of the sensitivity function provides a controller transfer function that suppresses the effect of a disturbance and is suitable for the response characteristic of the plant. As a result, a good control performance can be achieved with keeping design man-hours under control.

The sensitivity function (S(z)) may be defined in such a manner that a numerator order of the controller transfer function (C(z)) is less than a denominator order of the controller transfer function and a high-pass filter property is implemented. Consequently, a viable, steady-error free feedback controller can be structured.

The sensitivity function (S(z)) may be defined as a linear sum of a plurality of sensitivity functions ($S1(z)$, $S2(z)$) corresponding to a plurality of response characteristic parameters (α, α') that indicate the response characteristics of the plant. Since the response characteristic of the plant varies depending on the characteristics of the elements that constitute the plant, a good control performance can be achieved over a wider frequency range by defining the sensitivity function as a linear sum of a plurality of sensitivity functions.

The plant controller may include a corrected target value calculation unit that calculates a corrected target value (KCMDM) by applying the transfer function (P(z)) of the control target model to the target value (KCMD). The feedback controller calculates the control input (KAF) in such a manner that the control output (KACT) matches the corrected target value (KCMDM). Applying the corrected target value can control a component arising from a plant dead time component and first-order lag element, which is contained in a difference (deviation) between the control output and the corrected target value associated with a rapid change to the target value. As a result, unnecessary changes in the control input associated with a transient state can be controlled, thereby allowing a good control performance to be maintained.

The plant may include an internal combustion engine 1 and an air-fuel ratio sensor 17 for detecting an oxygen concentration in exhaust emissions from the internal combustion engine, and the feedback controller may calculate an air-fuel ratio control amount (KAF) that is the control input in such a manner that an detected air-fuel ratio (KACT) matches a target air-fuel ratio (KCMD), and the response characteristic parameter (α) may be set on the basis of the response time constant (τS) of the air-fuel ratio sensor. It has been confirmed that, in the air-fuel ratio control, the engine can be approximated by a dead time component, and the response characteristic of the air-fuel ratio sensor can be approximated by a first-order lag element. For this reason, a good air-fuel ratio control performance can be achieved by setting the response characteristic parameter on the basis of the response time constant of the air-fuel ratio sensor.

The plant may include an internal combustion engine 1 and a torque control section 45 that controls the output torque of the engine, and the feedback controller may calculate a target torque (TQFB, TQCMD) of the engine which is the control input in such a manner that a detected engine speed (NE) of the engine matches a target engine speed (NOBJ), and the response characteristic parameter may be a parameter ($\alpha 1$) that is set on the basis of a response characteristic of the torque control section 45. It has been confirmed that, in the engine speed control, an internal combustion engine and a torque control section can be approximated by a second-order lag element and its response characteristic mainly depends on the response characteristic of the torque control section. For this reason, a good engine speed control performance can be achieved by setting the response characteristic parameter on the basis of the response characteristic of the torque control section.

The plant may be a valve operational phase varying mechanism 56 that continuously varies the operational phase of an intake valve of the internal combustion engine, and the feedback controller may calculate a duty (DTFB, DUTY) of a drive signal supplied to the valve operational phase varying mechanism 56, which is the control input in such a manner that a detected operational phase (VPA) matches a target operational phase (VPACMD), and the response characteristic parameter may be a parameter ($\alpha 3$) that is set on the basis of a response characteristic of an operating oil of the valve operational phase varying mechanism 56. It has been confirmed that the valve operational phase varying mechanism can be approximated by a second-order lag element and its response characteristic mainly depends on the response characteristic of the operating fluid. For this reason, a good valve operational phase control performance can be achieved by setting the response characteristic parameter on the basis of the response characteristic of the operating fluid.

Obviously, numerous modifications and variations of the present invention are possible in light of the above teachings. It is therefore to be understood that within the scope of the appended claims, the invention may be practiced otherwise than as specifically described herein.

What is claimed is:

1. A plant controller comprising:
a feedback controller configured to calculate a control input provided to a plant so that a control output of the plant matches a target value, the feedback controller including a controller transfer function that is a transfer function of the feedback controller, the controller transfer function being expressed by a product of an inverse transfer function of a transfer function of a control target model obtained by modeling the plant and a disturbance sensitivity correlation function defined using a sensitivity function that indicates sensitivity of a disturbance to be applied to the plant with respect to the control output, the sensitivity function being defined by using a response characteristic parameter that indicates a response characteristic of the plant.

2. The plant controller according to claim 1, wherein the sensitivity function is defined in such a manner that a numerator order of the controller transfer function is less than a denominator order of the controller transfer function and a high-pass filter property is implemented.

3. The plant controller according to claim 2, wherein the sensitivity function is defined as a linear sum of a plurality of sensitivity functions each corresponding to each of a plurality of response characteristic parameters that indicates the response characteristic of the plant.

4. The plant controller according to claim 3, further comprising a corrected target value calculator configured to calculate a corrected target value by applying the transfer function of the control target model to the target value, wherein the feedback controller calculates the control input so that the control output matches the corrected target value.

5. The plant controller according to claim 4, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

6. The plant controller according to claim 2, further comprising a corrected target value calculator configured to calculate a corrected target value by applying the transfer function of the control target model to the target value, wherein the feedback controller calculates the control input so that the control output matches the corrected target value.

7. The plant controller according to claim 6, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

8. The plant controller according to claim 2, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

9. The plant controller according to claim 3, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

10. The plant controller according to claim 3, wherein the plant includes an internal combustion engine and a torque control section that controls an output torque of the engine, and the feedback controller calculates a target torque of the engine, which is the control input so that a detected engine speed of the engine matches a target engine speed, and the response characteristic parameter is set on a basis of a response characteristic of the torque control section.

11. The plant controller according to claim 3, wherein the plant includes a valve operational phase varying mechanism that continuously varies an operational phase of an intake valve of an internal combustion engine, and the feedback controller calculates a duty of a drive signal supplied to the valve operational phase varying mechanism, which is the control input so that the detected operational phase matches a target operational phase, and the response characteristic parameter is set on a basis of a response characteristic of an operating oil of the valve operational phase varying mechanism.

12. The plant controller according to claim 1, wherein the sensitivity function is defined as a linear sum of a plurality of sensitivity functions each corresponding to each of a plurality of response characteristic parameters that indicates the response characteristic of the plant.

13. The plant controller according to claim 12, further comprising a corrected target value calculator configured to calculate a corrected target value by applying the transfer function of the control target model to the target value, wherein the feedback controller calculates the control input so that the control output matches the corrected target value.

14. The plant controller according to claim 13, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

15. The plant controller according to claim 12, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

16. The plant controller according to claim 1, further comprising a corrected target value calculator configured to calculate a corrected target value by applying the transfer function of the control target model to the target value, wherein the feedback controller calculates the control input so that the control output matches the corrected target value.

17. The plant controller according to claim 16, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

18. The plant controller according to claim 1, wherein the plant includes an internal combustion engine and an air-fuel ratio sensor for detecting an oxygen concentration in exhaust emissions from the internal combustion engine, and the feedback controller calculates an air-fuel ratio control amount that is the control input so that a detected air-fuel ratio matches a target air-fuel ratio, and the response characteristic parameter is set on a basis of a response time constant of the air-fuel ratio sensor.

19. The plant controller according to claim 1, wherein the plant includes an internal combustion engine and a torque control section that controls an output torque of the engine, and the feedback controller calculates a target torque of the engine, which is the control input so that a detected engine speed of the engine matches a target engine speed, and the response characteristic parameter is set on a basis of a response characteristic of the torque control section.

20. The plant controller according to claim 1, wherein the plant includes a valve operational phase varying mechanism that continuously varies an operational phase of an intake valve of an internal combustion engine, and the feedback controller calculates a duty of a drive signal supplied to the valve operational phase varying mechanism, which is the control input so that the detected operational phase matches a target operational phase, and the response characteristic parameter is set on a basis of a response characteristic of an operating oil of the valve operational phase varying mechanism.

* * * * *